United States Patent [19]

Eifert et al.

[11] Patent Number: 5,509,749
[45] Date of Patent: Apr. 23, 1996

[54] COMPRESSION LOWER PRELOADED BALL JOINT

[75] Inventors: Charles D. Eifert, Vandalia; Patrick H. Fullenkamp, Bellbrook; Douglas M. Brademeyer, West Chester, all of Ohio

[73] Assignee: General Motors Corporation, Detroit, Mich.

[21] Appl. No.: 313,931

[22] Filed: Sep. 28, 1994

[51] Int. Cl.$^6$ ...................................... F16C 11/08
[52] U.S. Cl. ........................... 403/144; 403/132; 403/133
[58] Field of Search ...................................... 403/128, 129, 403/130, 131, 132, 133, 136, 137, 138, 144, 146, 147

[56] References Cited

U.S. PATENT DOCUMENTS

| Re. 27,114 | 4/1971 | Scheublein et al. | 403/147 |
|---|---|---|---|
| 2,096,966 | 10/1937 | Hufferd | 403/144 |
| 2,122,655 | 7/1938 | Niles | 403/138 X |
| 3,053,556 | 9/1962 | Klocke et al. | 403/138 |
| 3,945,737 | 3/1976 | Herbenar | 403/132 X |
| 4,017,197 | 4/1977 | Farrant | 403/27 |
| 4,063,834 | 12/1977 | Hanson et al. | 403/138 |
| 4,163,617 | 8/1979 | Nemoto | 403/132 |
| 4,358,211 | 11/1982 | Goodrich, Jr. et al. | 403/27 |
| 4,410,295 | 10/1983 | Ersoy et al. | 403/122 |
| 4,520,546 | 6/1985 | Darnell | 29/441 R |
| 4,693,628 | 9/1987 | Renk | 403/135 |

FOREIGN PATENT DOCUMENTS

| 2441916 | 3/1976 | Germany . | |
| 737811 | 10/1955 | United Kingdom | 403/132 |

Primary Examiner—Anthony Knight
Attorney, Agent, or Firm—Jeffrey A. Sedlar

[57] ABSTRACT

A compression lower ball joint includes a ball pivotally mounted in a socket. The ball includes a substantially hemispherical bearing with a recess receiving a post of a stud which includes a parti-spherical head adapted to mate with the bearing. A spring is disposed between the post and the bearing providing a preload to force the bearing and stud apart maintaining the joint in a tight condition until a predetermined amount of wear has occurred. This provides a positive indication of when the joint is worn and in need of replacement.

7 Claims, 2 Drawing Sheets

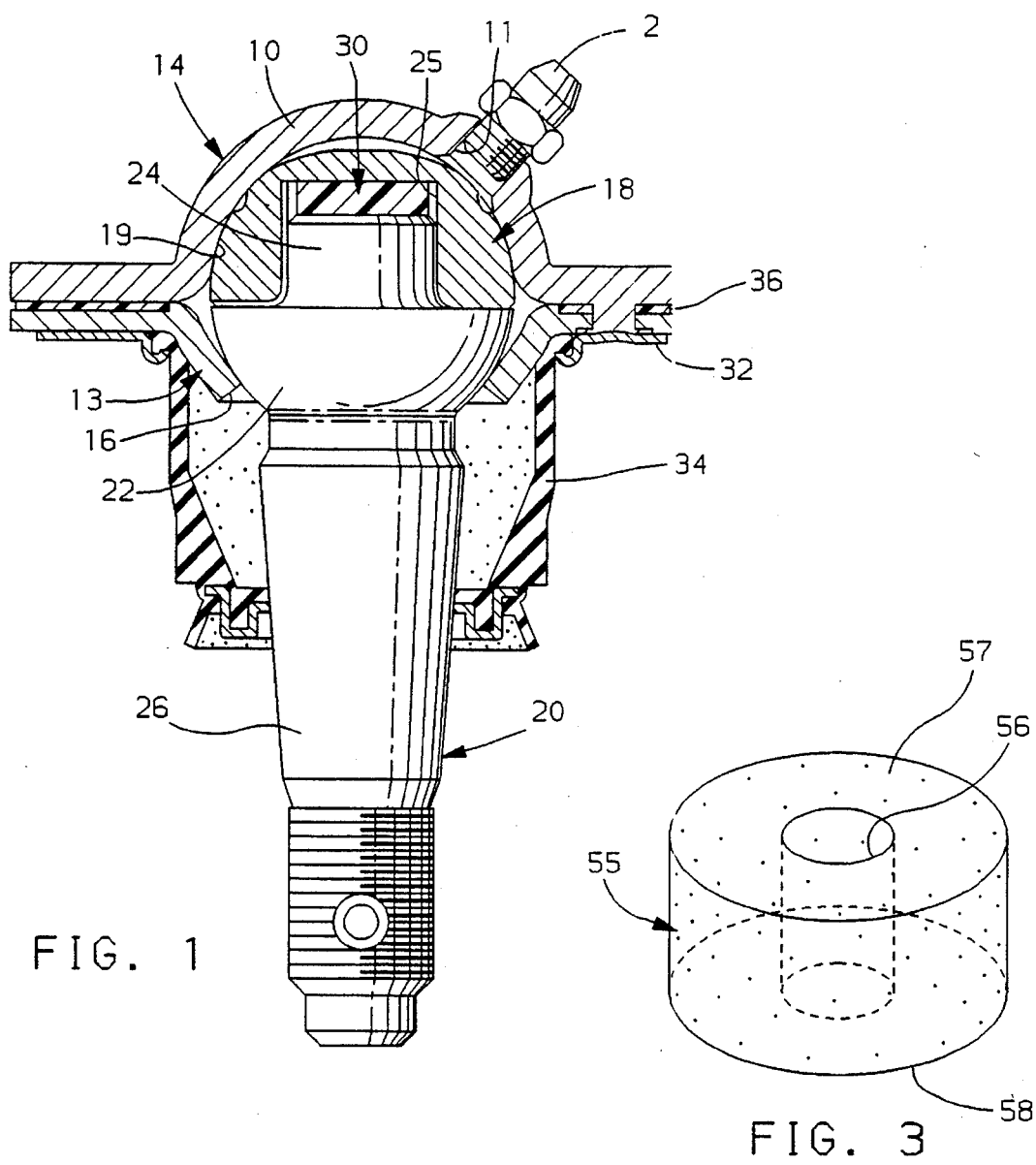
FIG. 1
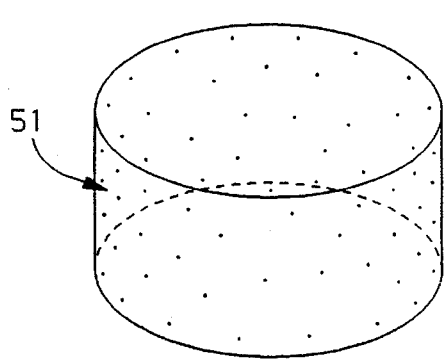
FIG. 2
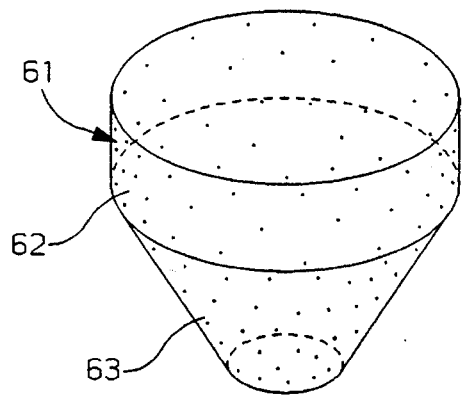
FIG. 3
FIG. 4

5,509,749

COMPRESSION LOWER PRELOADED BALL JOINT

BACKGROUND OF THE INVENTION

The present invention relates to pivotable ball joints and more specifically, to pivotable compression ball joints.

There are several types of known vehicle suspension systems. A common component in these suspension systems is the ball joint. Depending on the suspension type, the ball joint may be a load-bearing ball joint in tension, a load-bearing ball joint in compression or a non-load-bearing ball joint which is also known as a stabilizing ball joint.

A suspension's ball joint is designed to provide proper vehicle steering function. Ball joints are intended to require a proper amount of torque to pivot with minimal variations. A proper amount of ball joint tightness is required for steering alignment capability and smooth steering. If the torque is too high, increased steering effort results which places an increased load on the steering system and yields poor returnability. If the torque is too low, return overshoot occurs and wheel kick results from road inputs.

Additionally, ball joints are designed so that internal wear is minimized. However, the ball joints used in vehicle suspension systems are inevitably subject to wear over time. Therefore, a convenient and a reliable method of determining when joint wear has proceeded to a point requiring replacement of the ball joint is required. Conventionally, the method used for determining when a ball joint is worn to the point of requiring replacement is to manually check for looseness in the joint. This diagnostic technique has proven to be sufficient for stabilizing ball joints which are not under an axial load. This is because the stabilizing ball joint when worn will generally contribute to looseness in the vehicle suspension in a horizontal direction. The stabilizing ball joint is typically designed so that when horizontal suspension looseness is sensed, a worn ball joint condition is properly diagnosed as the cause.

A known diagnostic technique for use with suspension ball joints which are under a vertical axial load is to support the vehicle at the suspension control arm and pry under the wheel to check for relative displacement between the wheel and the control arm. It has been found that this common method of measuring vertical looseness in the ball joint tends to lead to repeated misdiagnoses of ball joints as being in a worn condition when in fact they are still in a suitably operable condition.

For tension ball joints this misdiagnoses problem was overcome by designing a preloaded ball joint with a wear indicator. This type of prior art ball joint is illustrated in FIG. 4 and is explained in detail in U.S. Pat. No. 4,358,211 to Goodrich which is assigned to the assignee of this invention.

For the tension ball joint as shown in FIG. 4, an axial load is typically applied downward on stud 8. This axial load results in the force on head 5 being normally in a downward direction, causing the main bearing surface of the joint to be at interface 6. A preload is applied to the joint by elastomeric ring 2 which is positioned between cover 4 and upper bearing seat 3. Therefore, the preload applied to stud 8 by ring 2 is in the same direction as the tension load.

Upper bearing seat 3 includes protuberance 7 which extends outside cover 4. As wear occurs in the joint, for the most part at interface 6, elastomeric ring 9 expands to take up the space vacated by the worn metal, and protuberance 7 withdraws within cover 4. Retraction of protuberance 7 provides a method for visually determining the amount of wear that has occurred in the tension ball joint. By providing a means of visual diagnoses, misdiagnosis problems have been substantially eliminated for a suspension's preloaded tension ball joints.

In the case of compression lower ball joints however, the design and loading direction make it much more difficult to incorporate a wear indicator. With a compression lower ball joint, the compressive load that is normally applied to the joint prevents the prior art design as illustrated in FIG. 4 from operating. With a compression ball joint the compressive force is in the opposite direction of the preload force on the stud 8 of FIG. 4 and therefore, would prevent the protuberance 7 from retracting into the cover 4 properly, thereby preventing this known prior-art diagnostic mechanism from operating.

Conventional compression lower ball joints used in automotive suspensions comprise a metal ball contained within a metal socket. The ball has a stud extending therefrom through an opening in the socket wall. The socket is attached to one suspension component and the stud is attached to another thereby permitting relative pivoting movement therebetween.

This type of joint normally exhibits some looseness. If a joint is constructed too tightly, the ball joint becomes locked in position potentially interfering with joint operation and with assembly of the joint into a suspension. If the joint is too loose it will likely be found defective and replaced even though it is not worn. Because of the normal looseness associated with a non-preloaded joint, the conventional compression ball joint is susceptible to misdiagnosis as being worn-out when in fact it is still in operable condition. This leads to unnecessary ball joint replacement costs. Therefore, a compression ball joint is required that provides a positive indication of when it is worn to the point of requiring replacement.

SUMMARY OF THE INVENTION

The purpose of this invention is to provide a compressive ball joint that is capable of transferring vehicle loads to help provide a smooth vehicle ride and yet maintains a proper preload tightness up until the time a predetermined amount of wear occurs. Once joint looseness is perceived, a proper diagnosis is made to replace the ball joint.

The ball joint comprises a lubed, metal-to-metal bearing surface ball and socket construction. The ball joint includes a spring which, in one embodiment, comprises a pressure cylinder made of durable nonabrasive and elastic material which is compressed during assembly between two portions of the ball part of the joint.

As the ball joint is used in typical vehicle operation, wear occurs between the ball and socket part of the joint. This wear is compensated for by expansion of the spring which forces the two portions of the ball part of the joint to remain in contact against the socket, maintaining the ball joint in an acceptably tight condition. Expansion of the spring decreases the preload on the joint such that once a predetermined amount of wear has occurred, the preload will be diminished and the ball joint will appear loose. Because the ball joint exhibits looseness only after the preload has been surpassed, a positive indication that the ball joint is in need of replacement is provided.

BRIEF DESCRIPTION OF THE DRAWINGS

FIG. 1 is a cross-sectional illustration of a preloaded lower compression ball joint for a vehicle.

FIG. 2 is a perspective illustration of a compression joint spring.

FIG. 3 is a perspective illustration of a compression ball joint spring.

FIG. 4 is a perspective illustration of a compression ball joint spring.

DETAILED DESCRIPTION OF THE PRESENTLY PREFFERED EMBODIMENT

Figure 5:
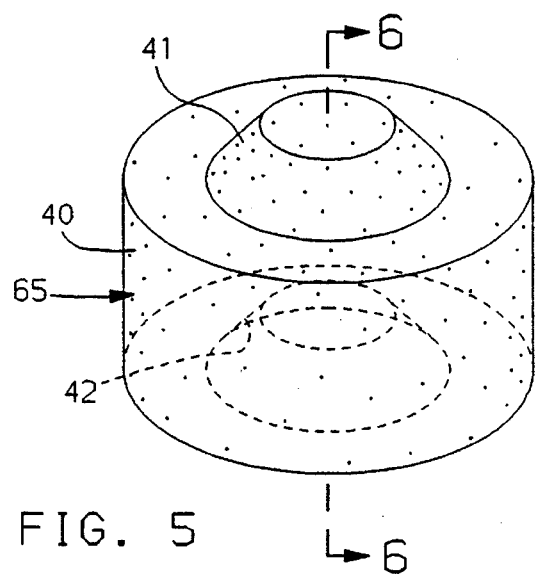
FIG. 5 is a perspective illustration of a compression ball joint spring.
Figure 6:
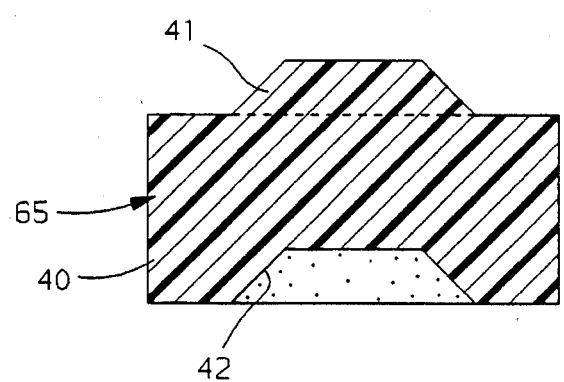
FIG. 6 is a cross sectional view taken generally through the plane indicated by the line 6—6 in FIG. 5.
Figure 7:
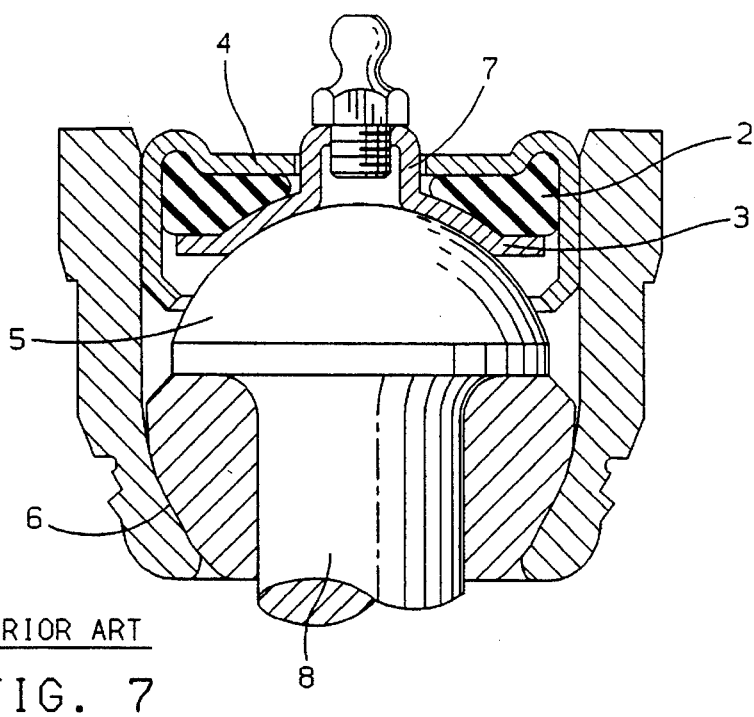
FIG. 7 is a prior art illustration of a preloaded tension lower ball joint.

Referring to the drawings, illustrated in FIG. 1 is a ball and socket joint such as employed in a motor vehicle suspension. The joint illustrated is of the type that operates under a compressive load. The ball portion of the joint includes substantially hemispherical bearing 18 having recess 25 formed therein. Mating with bearing 18 is stud 20 which is comprised of parti-spherical head 22, post 24 and shank 26. Post 24 is substantially cylindrical and finds accommodation in recess 25 which is formed in substantially hemispherical bearing 18. When mated together, parti-spherical head 22 and bearing 18 form a substantially spherical ball which is disposed in socket 14.

Socket 14 is comprised of seat 10 which includes opening 11 in its upper end for a grease fitting 12. Socket 14 also includes ball retainer 13 which has an opening 16 in its lower end. The shank 26 of stud 20 protrudes through opening 16 in retainer 13 of socket 14.

A seal retainer 32 is crimped onto the socket 14 and holds a seal 34 in proper position to protect the interior of the ball joint against contaminants. A gasket 36 is disposed as a seal between seat 10 and ball retainer 13 of socket 14.

An insert designated as pressure cylinder 30 made of a durable nonabrasive and elastic material is compressed between stud post 24 and recess 25 of bearing 18. Pressure cylinder 30 functions as a spring which is normally compressed and exerts a force directed such that the substantially hemispherical bearing 18 and the stud 20 are forced apart. As wear occurs in the ball joint pressure cylinder 30 forces bearing 18 and stud 20 apart to compensate for the wear. Pressure cylinder 30 is sized such that once a predetermined amount of wear has occurred in the ball joint it will be substantially fully expanded to its normal non-compressed dimensions and therefore, additional wear will not be compensated for.

Alternative embodiments of pressure cylinder 30 are illustrated in greater detail in the normal non-compressed configuration in FIGS. 2 through 6. FIG. 2 illustrates an embodiment comprising a pressure cylinder 51 of a solid cylindrical section. This construction is conveniently shaped to fit within recess 25 of bearing 18 for compression by the insertion of post 24.

Pressure cylinder 55, as illustrated in FIG. 3, also comprises a cylindrical section. However, an opening 56 extends through pressure cylinder 55 from the top surface 56 to the bottom surface 58. Alternatively, the opening extends only partially through pressure cylinder 55. Opening 56 provides area for the material of pressure cylinder 55 to flow into during compression in recess 25 by post 24. This permits greater deformation to occur with pressure cylinder 55 as opposed to pressure cylinder 51 when subjected to the same magnitude of preload. This results in greater relative movement between bearing 18 and stud 20 as the preload magnitude is changed.

In the embodiment of FIG. 4, pressure cylinder 61 comprises a two-tiered construction with solid cylindrical segment 62 forming a first tier which is sized for positioning within recess 25 of bearing 18. Extending from the bottom of cylindrical segment 62 is frustoconical section 63 forming a second tier which is progressively, relatively smaller in diameter than cylindrical segment 62. Frustoconical section 63 is the primary source of motive material during compression of pressure cylinder 61, although heavier preloads deform cylindrical segment 62.

In the embodiment of FIG. 5, pressure cylinder 65 comprises a two-tiered construction with cylindrical segment 40 forming a first tier which is sized for positioning within recess 25 of bearing 18. Extending from the top of cylindrical segment 40 is frustoconical section 41 forming a second tier which is relatively smaller in diameter and height than cylindrical segment 40. The base of cylindrical segment 40 includes frustoconical shaped opening 42. Frustoconical section 41 is the primary source of motive material during compression of pressure cylinder 30, although heavier preloads deform cylindrical segment 40.

The force exerted on the ball joint assembly can be closely controlled by the selection of material and the configuration of pressure cylinder 30. An appropriate material for use as pressure cylinder 30 is polyurethane although other elastomerics are suitable and the material selection is dependent upon the application.

The configuration of pressure cylinder 30 provides a convenient mechanism for controlling the amount of expansion as required for use in indicating wear of a ball joint. A sufficient amount of preload for a ball joint used in an automotive suspension is in the neighborhood of 40–60 pounds. When compressed between bearing 18 and post 24, pressure cylinder 30 generally comprises a substantially cylindrical form as illustrated in FIG. 1. During joint wear, as pressure cylinder 30 substantially returns to its original shape, the ball joint begins to exhibit looseness and therefore, at a predetermined point, indicates that wear has occurred.

The compression of pressure cylinder 30 between post 24 and bearing 18 in recess 25 occurs when the ball joint is assembled which provides tightness to the ball joint even in a non-loaded state, such as when the vehicle is supported at the control arm during servicing. Therefore, the joint's construction helps eliminate misdiagnosis of ball joints by maintaining a suitably tight assembly when still serviceable. Other than when the vehicle is supported at the control arm the vehicle's weight on the suspension generally maintains the ball joint under a significant compressive load, forcing stud 24 into bearing 18 and against seat 10 of socket 14.

As the ball joint is used wear occurs, such as, on the bearing 18 and/or the interior surface 19 of seat 10. This wear is compensated for by expansion of pressure cylinder 30 which forces stud head 22 against the ball retainer 13 of socket 14 keeping the ball joint in a tight condition even when the normal compressive load is relieved. Expansion of the pressure cylinder 30 during wear decreases the preload on the joint such that once a predetermined amount of wear has occurred the preload will be diminished to the point where the ball joint appears loose. Once the ball joint exhibits perceptible vertical looseness, a proper diagnosis is made that the ball joint is in need of replacement.

What is claimed is:

1. A compression ball joint comprising:

a housing forming a socket;

a substantially hemispherical bearing having a recess and disposed in the socket;

a stud including a parti-spherical head adaptively mating with the substantially hemispherical bearing with a post extending into the recess; and a spring disposed in the recess between the post and the bearing, wherein the spring comprises a resilient solid formed in a two tiered construction, one tier being larger than the other.

2. A compression ball joint according to claim 1 wherein the spring comprises a resilient construction with a cylindrical segment having an opening therein.

3. A compression ball joint comprising:

a housing with a wall forming a substantially spherical cavity having a bearing seat within the cavity and an opening through the housing wall opposite the bearing seat;

a substantially hemispherical bearing engaging the bearing seat and having a recess directed toward the opening;

a stud including a parti-spherical head disposed in the substantially spherical cavity adjacent to the substantially hemispherical bearing with a post extending into the recess and a shank extending through the housing's opening; and a spring disposed in the recess between the post and the bearing.

4. A compression ball joint according to claim 3 wherein the spring comprises a resilient material formed in a two tiered construction, one tier being larger than the other.

5. A compression ball joint according to claim 3 wherein the spring comprises a resilient material with a cylindrical segment having an opening therein.

6. A compression ball joint comprising:

a housing with a wall forming a substantially spherical cavity having a bearing seat within the cavity and an opening through the housing wall opposite the bearing seat;

a substantially hemispherical bearing mating with the bearing seat and having a recess directed toward the opening;

a stud including a parti-spherical head disposed in the substantially spherical cavity mating with the substantially hemispherical bearing with a post extending into the recess and a shank extending through the housing's opening; and a spring disposed in the recess between the post and the bearing including a cylindrical segment and a frusto-conical section extending therefrom, wherein the spring is compressed between the stud and the bearing.

7. A compression ball joint according to claim 6 wherein the stud is normally under a compressive force which forces the bearing against the bearing seat.

\* \* \* \* \*